Sept. 9, 1958     E. W. KIELSMEIER     2,851,363
MANUFACTURE OF CHEESE CURD
Filed March 4, 1955
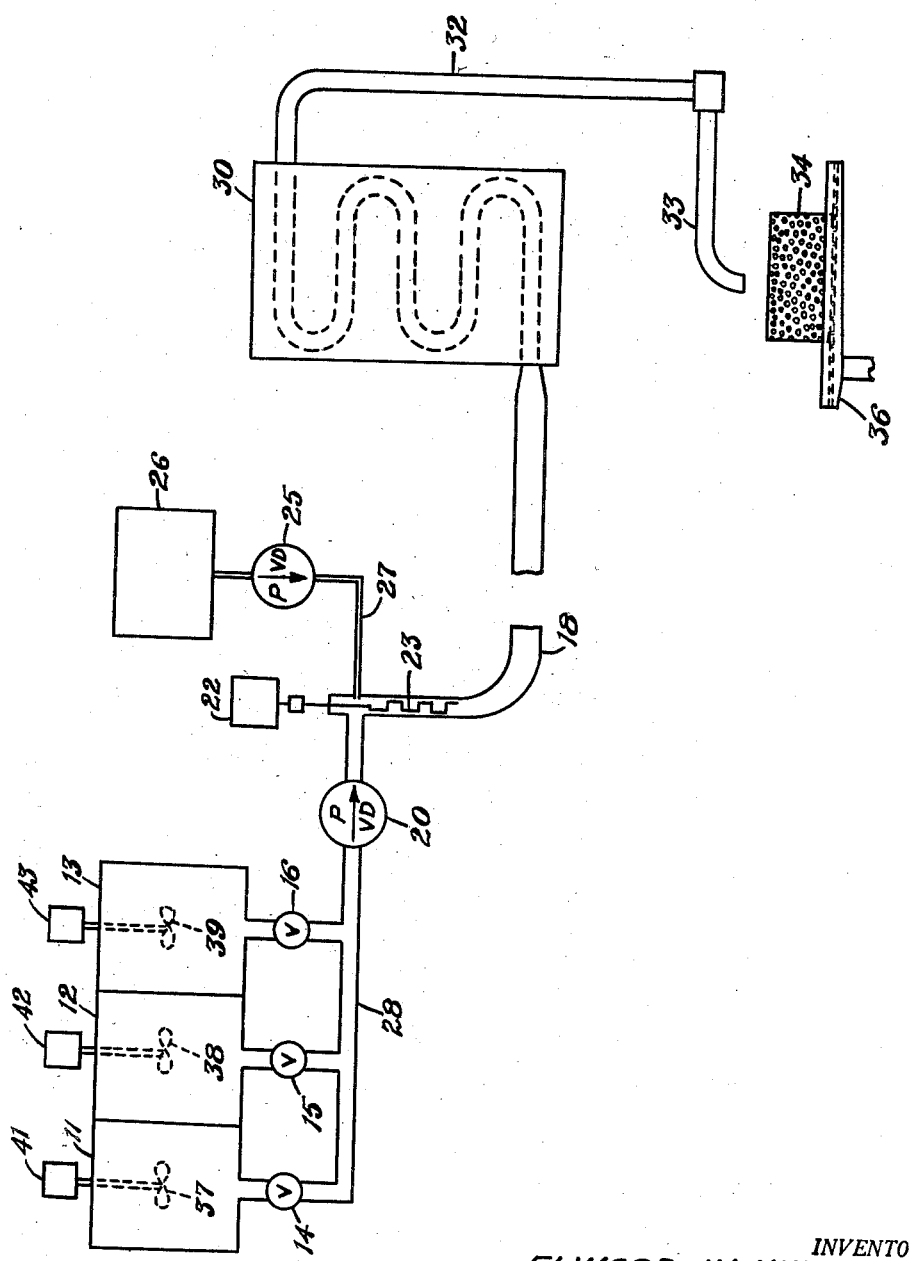
INVENTOR.
ELWOOD W. KIELSMEIER
BY
R. G. Story
ATTORNEY United States Patent Office 2,851,363
Patented Sept. 9, 1958

2,851,363
MANUFACTURE OF CHEESE CURD

Elwood W. Kielsmeier, Fond du Lac, Wis., assignor to Swift & Company, Chicago, Ill., a corporation of Illinois Application March 4, 1955, Serial No. 492,139

7 Claims. (Cl. 99—116)

This invention relates to an improved process for the manufacture of cheese curd.

Conventionally, the manufacture of cheese curd is a time-consuming and painstaking process requiring considerable skilled labor and space. A culture is introduced to a vat of milk, and the milk is held at a suitable temperature for a period of time to promote ripening, the length of time depending on the concentration and activity of the culture, temperature, the characteristics of the milk itself and other factors. Following the ripening period, rennet is added to form a coagulum made up of curd and whey. The mass of the coagulum is then cut into cubes. Following this, the temperature of the cubed mass is raised to promote separation of the whey from the curd, and after approximately 2½ hours from the addition of the rennet, during which time acid is produced by bacterial action, the whey is drawn off from the vat, leaving the cubed mass which is allowed to mat. The mass is next cut into strips, thus completing the manufacture of the cheese curd. The steps and the conditions may be varied and are varied to give differing types of cheese curd.

The cheese industry has appreciated for some years that the action of rennet upon the milk protein is completed within a relatively short time, probably within 10 to 20 minutes, and that the balance of the time consumed in the manufacture of cheese curd is required principally for the microorganisms of the culture to form lactic acid to give the necessary acidity for a good cheese curd. It has not been feasible in conventional cheese manufacture to add lactic acid directly to the coagulum as this necessitated agitation of the coagulum to obtain effective dispersion of the acid throughout, and such agitation shattered the curd, making it unsuitable for cheese manufacture. Lactic acid added with or before the rennet causes instant coagulation (souring) of the milk and prevents the production of a satisfactory curd.

Through the practice of my process it is possible to introduce lactic acid or other suitable acid and still obtain a coagulum having the strength and individual particle size necessary for cheese manufacture. Since there is no prolonged holding period for the formation of lactic acid in situ as in conventional manufacture, there is a considerable reduction in the time required for processing.

The accompanying drawing is a diagrammatic representation of the apparatus layout for the manufacture of the cheese curd in accordance with the invention.

Curd is an insoluble calcium (and magnesium) salt of the milk protein (casein) which protein has been altered by the enzymatic action of the rennet. It is imperative in my process that the formation of the coagulum, which normally occurs with the introduction of the rennet, be temporarily delayed until the casein has been substantially completely modified by the enzymes of the rennet. This I accomplish by placing the calcium and magnesium in an unreactive form before the rennet has the opportunity to form the insoluble calcium and magnesium salts of the milk protein, and after the substantial conversion of the casein of the milk to paracasein I add an acid to give the desired acidity and to release the magnesium and calcium ions for the formation of the coagulum.

Broadly speaking, my process for the manufacture of cheese curd comprises placing the bivalent alkaline earth metal ions of the milk in a form which forestalls the formation of the coagulum, adding the rennet and a culture, and holding the milk and additives in a liquid form for a period of time sufficient to permit a substantially complete reaction between the enzymes of the rennet and the milk protein. The pH of the milk is then adjusted to the desired acidity. The curd is subsequently separated from the whey to complete the manufacture of the cheese curd.

Various salts may be used to place the calcium and magnesium ions in an insoluble form and thereby forestall the immediate formation of the coagulum with the addition of the rennet to the milk. Among the salts are tetrasodium pyrophosphate, sodium sulfate, and sodium carbonate, with the preferred salt being tetrasodium pyrophosphate. It is contemplated that the calcium and magnesium ions may be removed physically from the milk through ion exchange and later replaced to form the coagulum.

After the enzymes of the rennet have had an opportunity to complete conversion of the casein to paracasein, it is necessary that the alkaline earth metal ions be placed in the form suitable to permit formation of the coagulum. This is accomplished by lowering the pH of the milk, thereby freeing the calcium and magnesium ions and at the same time obtaining the necessary acidity for a good cheese curd. I have found the acid, preferably lactic acid, may be added to the milk approximately 20 minutes after the introduction of the rennet and the culture. The acidity of the milk is adjusted to a pH within the range of 4.9 to 6.0 and generally between 5.4 and 5.5. The pH will vary as to the type of cheese curd which is being manufactured. Various food acids may be used other than lactic acid, such as citric acid, acetic acid, and phosphorous acid.

Of course, various cultures may be used, depending upon the type of cheese which it is desired to produce. I have found that a commercial starter culture made up of organisms of the Streptococcus lactis type gives a very satisfactory curd. Other cultures that may be used contain the following organisms: *Streptococcus thermophilus, Lactobacillus bulgaricus, Streptococcus durans,* and *Streptococcus faecalis.*

It should be understood that my process may be varied to give differing types of cheese curd, among the variables being alteration of the pH range, the cultures employed, source of milk, temperatures, holding periods, etc.

In one preferred embodiment of my process I add tetrasodium pyrophosphate to form the insolube calcium and magnesium salts of pyrophosphate. Rennet and a culture containing organisms of the Streptococcus lactis type are added to the milk. If desirable for the particular cheese curd being manufactured, other enzymes may be introduced at this point. The milk with the additives are held for approximately 10 to 20 minutes to permit a substantially complete reaction of the milk with the rennet to form paracasein. Lactic acid is then added in an amount sufficient to adjust the pH of the milk to approximately 5.4. The acid frees the calcium and magnesium ions which then form the insoluble calcium and magnesium salts of the modified milk protein to give the coagulum. The lactic acid also assists in the expulsion of the whey from the curb. In my preferred method, the coagulum is moved through a tubular heat exchanger to raise its temperature, thereby hastening expulsion of whey from the curd, and thereafter the coagulum is placed in a perforated form lined with cheesecloth, and left there to drain.

In the accompanying drawing, three tanks, 11, 12, 13, are connected in parallel through individual valves 14, 15, and 16 to a common duct 18 which leads to a variable speed, positive action pump 20. For a setup capable of handling 5,000 pounds of milk per hour, the three tanks each have a 900-pound capacity and are preferably provided with stirrers 37, 38, and 39, driven by motors 41, 42, and 43, respectively. Tank 11 is first loaded with approximately 833 pounds of milk at a temperature within a range of 28° C. to 40° C., the temperature range favorable for rennet action. 10 pounds of tetrasodium pyrophosphate solution (which solution is made up of 10 pounds of the salt to 100 pounds of water), 3.5 pounds of rennet solution (which solution consists of 10 pounds of rennet extract and 90 pounds of water) and 15 pounds of starter culture are added to the milk of tank 11. This mixture is agitated continuously for 10 minutes during which time tank 12 is charged with the same amount of milk. When the 10-minute period has elapsed, the valve 14 is opened, admitting the milk to flow to pump 20 which is capable of emptying the tanks in approximately 10 minutes. Simultaneously with the opening of the valve 14, a motor 22 which drives a crank shaft type stirrer 23, and an acid pump 25 are started. The additives are placed in tank 12 at the same time.

A solution of lactic acid is delivered by the pump 25 from a corrosion resistant tank 26 through a capillary 27 at a rate of 18 pounds of the acid solution per each tank of milk. The solution comprises 10 pounds of lactic acid per 90 pounds of water and is delivered under pressure through the capillary in order to obtain a more effective dispersion of the acid in the milk.

Calcium chloride may be mixed with the acid solution in an amount not to exceed approximately 0.02 percent of the salt by weight of the milk. The calcium chloride is added to strengthen the coagulum.

The mixture of milk and additives and the later-introduced acid are thoroughly mixed together by the crank shaft stirrer and the flow continues through a holding tube 28 which has a 20-foot length and a 3-inch inside diameter wherein there is little agitation of the flowing coagulum. Following this short holding period, the coagulum passes through a tubular heat exchanger 30 of the conventional type where the curd-whey mixture is warmed to a temperature between 40° and 60° C. Tubular heat exchangers of the type illustrated in the book "Market Milk and Related Products," second edition, by H. H. Sommer, Olsen Publishing Co. (printers), Milwaukee, Wisconsin, may be employed. After heating, the curd-whey mixture passes through a pipe 32 to a pivotally mounted discharge nozzle 33 which directs the mixture into a separatory form 34 placed on a perforated draining table 36. The form is perforated and lined with cheesecloth. The cheese curd is left in the separatory forms until the whey is drained. Other means may be used to assist in the separation of the curd and whey, such as centrifuging or pressing. The above-described process is repeated with tanks 12 and 13 and next 13 and 11 and back to tanks 11 and 12 as described above.

It will be readily seen by those acquainted with cheese manufacture that the amount of lactic acid utilized may vary with the pH that is desired and with the milk used. A milk that is high in protein would require a greater amount of acid to achieve the same pH than would a milk that is low in protein because of the buffering effects of the protein.

Obviously, many modifications and variations of the invention as hereinbefore set forth may be made without departing from the spirit and scope thereof, and therefore only such limitations should be imposed as are indicated in the appended claims.

I claim:

1. A process for the manufacture of cheese curd from milk which comprises placing the calcium and magnesium ions of the milk in a form which forestalls the immediate formation of a coagulum, adding a culture and rennet to the milk, holding the milk with the rennet and the culture as a liquid for a period of time sufficient to permit a substantially complete reaction between the rennet and the milk protein, then providing adequate calcium and magnesium ions in a form suitable to permit the formation of a coagulum and acidifying the milk with a food acid to a pH within the range to free the calcium and magnesium ions and cause the formation of a coagulum, and thereafter separating the curd from the whey of the coagulum.

2. A process for the manufacture of cheese curd from milk which comprises placing the calcium and magnesium ions of the milk in a form which forestalls the immediate formation of a rennet coagulum, adding a culture and rennet to said milk, holding the milk and additives as a liquid until there has been a substantially complete conversion of the casein to paracasein, adding a food acid to lower the pH of the milk to within the range of 4.9 to 6.0 to cause the formation of a coagulum, and thereafter separating the curd from the whey of the coagulum.

3. A process for the manufacture of cheese curd from milk which comprises placing the calcium and magnesium ions of the milk in an insoluble form to forestall the immediate formation of a coagulum, adding rennet and a culture to said milk, holding the milk with the additives in a liquid form for a period of time sufficient to permit substantially complete reaction between the milk proteins and rennet, acidifying the milk with lactic acid to within the range of 4.9 and 6.0 thereby causing the formation of a coagulum, and thereafter separating the curd from the whey of the coagulum.

4. A process for the manufacture of cheese curd from milk which comprises placing the calcium and magnesium ions of the milk in an insoluble form to forestall the immediate formation of a coagulum, adding a culture and rennet to said milk, holding the milk and additives in a liquid form for a period of time sufficient to permit a substantially complete conversion of the casein to paracasein, adding lactic acid and calcium chloride to the milk to cause the formation of a coagulum, said lactic acid being added in an amount to adjust the acidity of the milk to within the range of 4.9 to 6.0, and thereafter separating the curd from the whey of the coagulum.

5. A process for the manufacture of cheese curd from milk which comprises adding tetrasodium pyrophosphate to the milk to form the calcium and magnesium salts of pyrophosphate to forestall the immediate formation of a coagulum, incorporating rennet and a culture in said milk, reacting the additives with the milk for a period of time sufficient to permit a substantially complete reaction of the milk with the rennet, adjusting the pH of the milk with an acid to within the range of 5.4 to 5.5 to cause the formation of a coagulum, and thereafter separating the curd from the whey of the coagulum.

6. A process substantially as described in claim 5, wherein calcium chloride is added with the acid to strengthen the curd of the coagulum.

7. In a process for the manufacture of cheese curd from milk, rennet and culture, the improvement which comprises placing the calcium and magnesium ions of the milk in such a form as to prevent formation of a coagulum until after the enzymes of the rennet added to the milk subsequent to binding the ions have substantially completely reacted with the milk protein, thereafter liberating the calcium and magnesium ions by acidifying the milk with a food acid to a pH within the range to free the calcium and magnesium ions and cause the formation of a coagulum, and subsequently separating the curd from the whey of the coagulum.

References Cited in the file of this patent

UNITED STATES PATENTS

| | | |
|---|---|---|
| 1,868,422 | Luecke | July 19, 1932 |
| 2,064,110 | Hall | Dec. 15, 1936 |
| 2,135,054 | Schwartz | Nov. 1, 1938 |
| 2,657,993 | Arkin | Nov. 3, 1953 |

OTHER REFERENCES

Heineman: Milk, Philadelphia 1919, pp. 86 to 97.

Lyman et al.: Ind. and Eng. Chem., vol. 25, November 1933, p. 1297.